(12) United States Patent
Dean et al.

(10) Patent No.: US 8,296,567 B2
(45) Date of Patent: Oct. 23, 2012

(54) SYSTEM AND METHOD FOR EXCHANGING KEY GENERATION PARAMETERS FOR SECURE COMMUNICATIONS

(75) Inventors: Edward Dean, Waterloo (CA); Roberto Diaz, Rolling Meadows, IL (US); James Godfrey, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 562 days.

(21) Appl. No.: 12/503,121

(22) Filed: Jul. 15, 2009

(65) Prior Publication Data

US 2011/0016322 A1 Jan. 20, 2011

(51) Int. Cl.
*H04L 29/06* (2006.01)

(52) U.S. Cl. ........ 713/171; 713/168; 713/169; 713/170; 713/174; 726/27; 726/28; 726/29; 726/30

(58) Field of Classification Search .................. 713/171
See application file for complete search history.

(56) References Cited

U.S. PATENT DOCUMENTS

| | | | |
|---|---|---|---|
| 6,226,383 B1 | 5/2001 | Jablon | 380/30 |
| 7,096,352 B2 * | 8/2006 | Kang et al. | 713/152 |
| 2002/0172367 A1 * | 11/2002 | Mulder et al. | 380/277 |
| 2005/0232428 A1 | 10/2005 | Little et al. | 380/277 |
| 2005/0251680 A1 | 11/2005 | Brown et al. | 713/171 |
| 2006/0095770 A1 | 5/2006 | Baylis et al. | 713/171 |
| 2007/0053313 A1 | 3/2007 | Adams et al. | 370/315 |
| 2007/0058559 A1 | 3/2007 | Xu | 370/252 |
| 2007/0192842 A1 | 8/2007 | Beaulieu et al. | 726/9 |
| 2007/0255784 A1 * | 11/2007 | Takechi et al. | 709/203 |
| 2007/0260822 A1 | 11/2007 | Adams | 711/147 |
| 2007/0263872 A1 | 11/2007 | Kirkup et al. | 380/273 |
| 2007/0266247 A1 | 11/2007 | Kirkup et al. | 713/171 |
| 2008/0152139 A1 | 6/2008 | Klassen et al. | 380/247 |
| 2008/0320588 A1 * | 12/2008 | Lipetz | 726/19 |

OTHER PUBLICATIONS

Harkins et al, "*The Internet Key Exchange (IKE),*" Cisco Systems, Request for Comments: 2409, IETF Standard, Internet Engineering Task Force, Nov. 1, 1998, XP015008193, ISSN: 0000-0003, 42 pages.

* cited by examiner

*Primary Examiner* — Longbit Chai
(74) *Attorney, Agent, or Firm* — Allen, Dyer, Doppelt, Milbrath & Gilchrist, P.A.

(57) ABSTRACT

A communication system exchanges key generation parameters for secure communications. An internet service and communications device of a user are in communication with each other. The internet service includes an account authentication mechanism for a user and includes a database having stored cryptographic keys and key generation parameters. A device client operates on the communications device and initiates a request to the internet service that authenticates the user and establishes a secure communications channel between the internet service and communications device and determine key generation parameters based on an authenticated user identifier and transmits the key generation parameters for initiating key generation and securely establishing a cryptographic key between the internet service and communications device.

22 Claims, 10 Drawing Sheets

SYSTEM AND METHOD FOR EXCHANGING KEY GENERATION PARAMETERS FOR SECURE COMMUNICATIONS

TECHNICAL FIELD

The present disclosure relates to the field of communications systems, and more particularly, to exchanging key generation parameters between a host server (or Internet Service) and device client such as a device that provides wireless communications, for example, a mobile or cellular phone, a smart phone, a personal digital assistant, or a computer.

BACKGROUND

Commands sent to certain applications on a wireless communications device such as a handheld device require authentication, which is accomplished by establishing a trusted, shared secret, for example, a symmetric key, and using this key to either digitally sign or encrypt the commands. The shared secret can be securely established using a mechanism similar to Diffie-Hellman key exchange and SPEKE (Simple Password Exponential Key Exchange). However, SPEKE requires the exchange of an initial shared secret, which seeds the key exchange (activation password). The key exchange must be initiated from the handheld.

A problem sometimes occurs in how the activation password is established between the device and those servers that provide an IS (Internet Service) considering the fact that: 1) users may need to set up services that require establishment of a symmetric key using multiple user interfaces, such as browser on the handheld device or browser on a personal computer (PC); 2) a user may not have a physical access to the device, for example, an administrator setting up an account on behalf of a user; and 3) the mailbox is typically not located in the same data center as the IS, and thus, it is more efficient to have the initial key exchange command sent directly to the IS instead of monitoring any IS mailbox for the initial key exchange commands.

Some approaches use a key exchange protocol similar to SPEKE (Simple Password Exponential Key Exchange) to establish a symmetric encryption key between a handheld device and a server. The device, for example, has an application preinstalled to allow activation on an enterprise server. A user calls their IT (Information Technology) administrator and requests that their corporate email account be activated on the device. The IT administrator generates a new activation password, stores the activation password in the server database and communicates this activation password to the user. The user launches the activation application and enters their email address and activation password. The device uses the activation password to seed the SPEKE-like key exchange and transmits the initial key exchange command directly to the user's corporate mailbox. The server monitors the mailbox, extracts the initial key exchange command and proceeds with the key exchange. The subsequent key exchange command contains routing information (for example, a service UID), which allows the device to send all remaining key exchange commands directly to the server, bypassing the mailbox. Another drawback is the necessity of calling a corporate administrator. In a consumer setting, this is not advantageous.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

Figure 1:
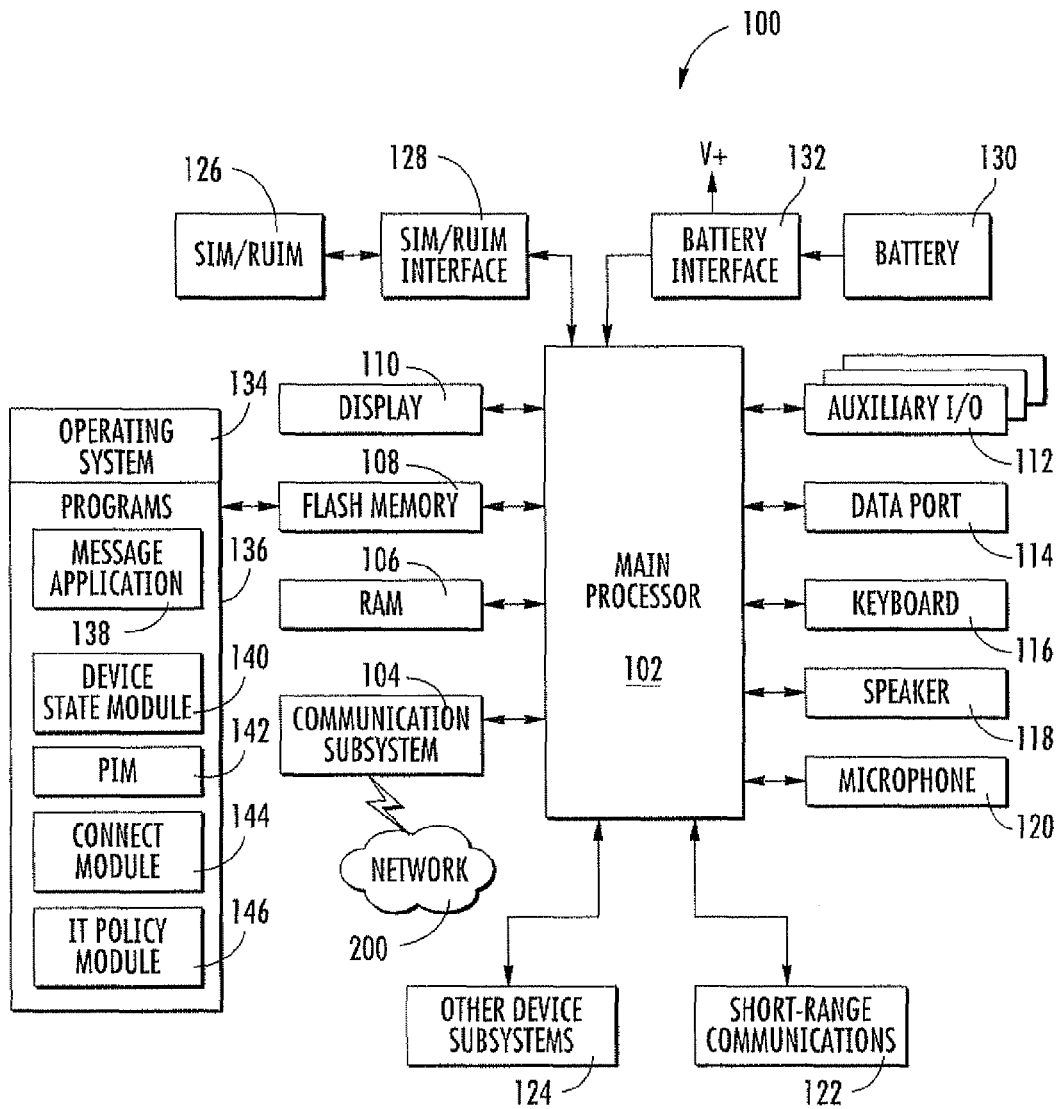
FIG. 1 is a block diagram of an example embodiment of a mobile device that can be used in accordance with non-limiting aspects.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

A communication system exchanges key generation parameters for secure communications. An internet service and communications device of a user are in communication with each other. The internet service includes an account authentication mechanism for a user and includes a database having stored cryptographic keys and key generation parameters. A device client operates on the communications device and initiates a request to the internet service that authenticates the user and establishes a secure communications channel between the internet service and communications device and looks up key generation parameters based on an authenticated user identifier and transmits the key generation parameters for initiating key generation and securely establishing a cryptographic key between the internet service and communications device.

In one example, the wireless communications device includes a user interface into which a user enters credentials, which in one example are a user name and password, which are transmitted to the internet service for authenticating the user. The internet service in response transmits the key generation parameters back to the communications device. These key generation parameters may include a password and server address to contact and initiate a key generation exchange. The user and password, in one example, include an email address and password of the electronic mail account of the user. An HTTPS connection can exist between the internet service and device client over which the user name and password are transmitted for authenticating the user at the internet service.

In yet another example the communications device includes a wireless communications device in communication with the internet service over a wireless connection. The user can enter multiple credentials corresponding to multiple user accounts and receive key generation parameters for each set of credentials, in yet another example.

A browser plug-in, for example, is included such that when a user enters credentials including a user name and password on a web page that is transmitted to the internet service for authenticating a user, the internet service in response returns an attachment containing key generation parameters that trigger the plug-in to execute and initiate a key generation exchange. The attachment is signed using a private key maintained by the internet server and verified by a corresponding public key maintained on the communication device.

A method and mobile wireless communications device is also set forth.

Figure 2:
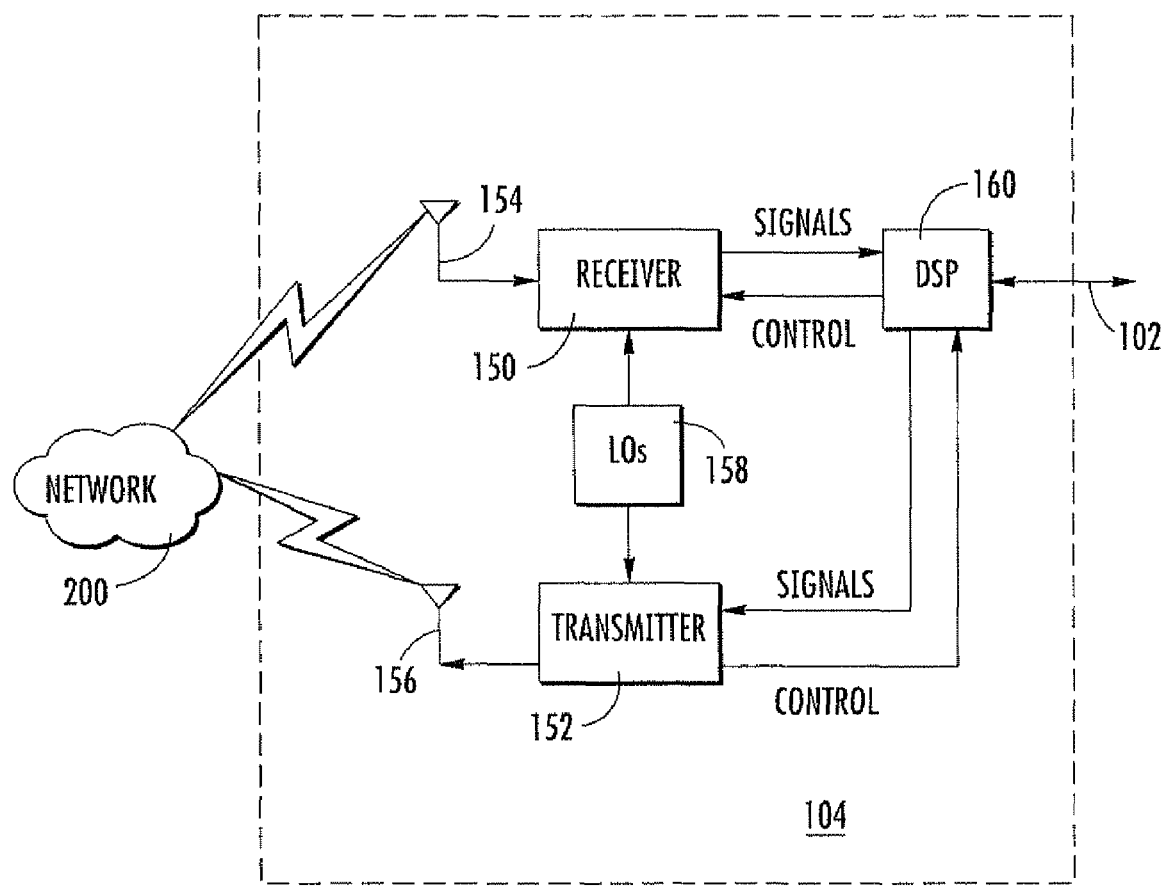
FIG. 2 is a block diagram of an example embodiment of a communication subsystem component of the mobile device of FIG. 1.
Figure 3:
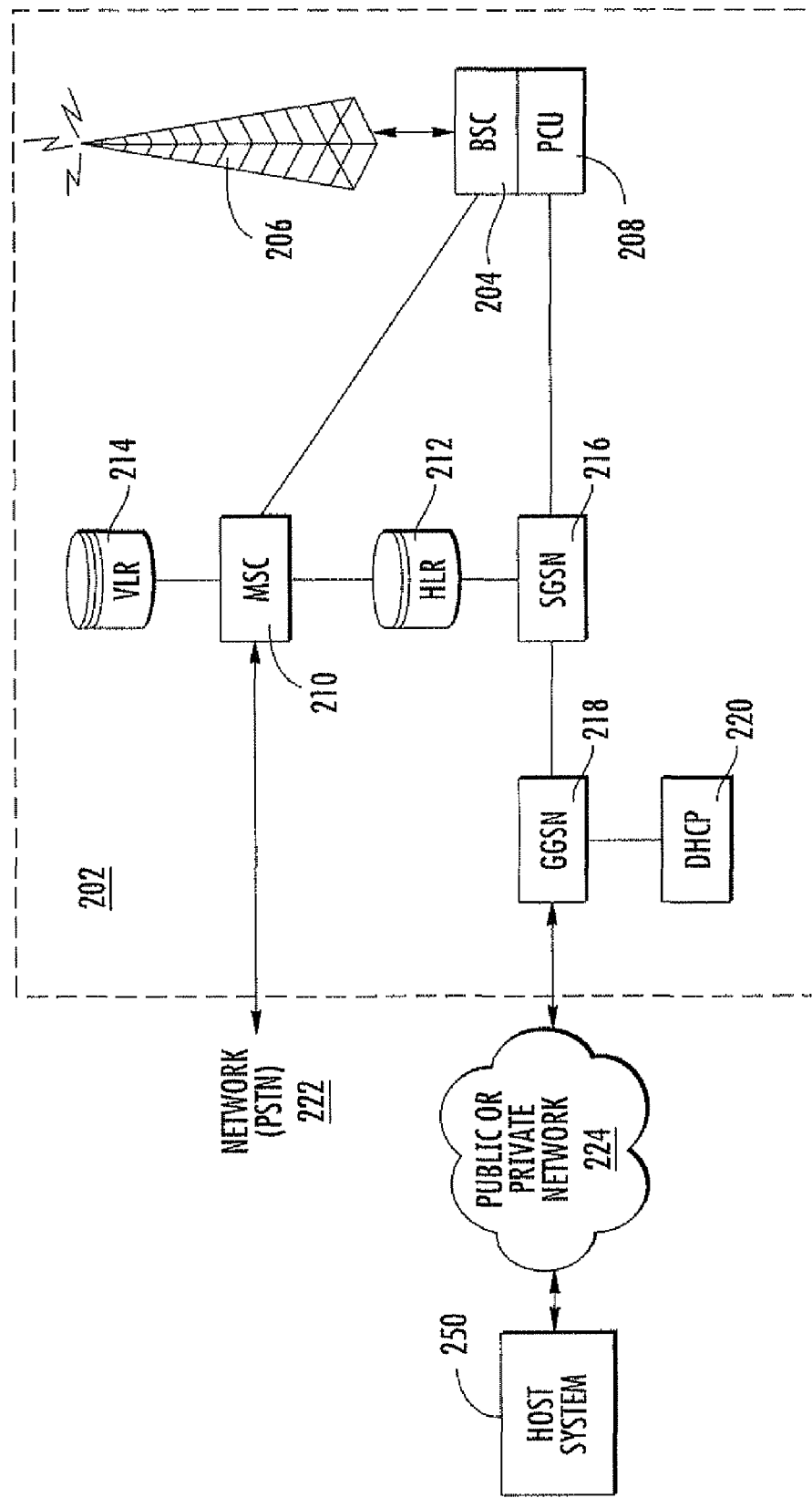
FIG. 3 is an example block diagram of a node of a wireless network.

There now follows a description relative to FIGS. 1-4 of an example embodiment of a mobile device, such as a mobile wireless communications device, communication subsystem component of the mobile device, a node in a wireless network that can be operable with the wireless device and components of a host system for use with the wireless network of FIG. 3 and the mobile device of FIG. 1. After a description of those components relative to FIGS. 1-4, a further description will follow relative to a description of FIGS. 5-11 of examples for and related aspects such as sequences for exchanging key generation parameters for secure communications in accordance with non-limiting examples.

The embodiments described herein generally relate to a mobile wireless communication device, also referred to as a mobile device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 1-4.

Referring first to FIG. 1, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e., Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as email, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e., the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, email, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USE port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an email message, or web page download will be processed by the communication subsystem 104 and input to the main processor 102. The main processor 102 will then process the received signal for output to the display 110 or alternatively to the auxiliary I/O subsystem 112. A subscriber may also compose data items, such as email messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Referring now to FIG. 2, an example block diagram of the communication subsystem component 104 is shown. The communication subsystem 104 includes a receiver 150, a transmitter 152, as well as associated components such as one or more embedded or internal antenna elements 154 and 156, Local Oscillators (LOS) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 2 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Referring now to FIG. 3, a block diagram of an example implementation of a node 202 of the wireless network 200 is shown. In practice, the wireless network 200 includes one or more nodes 202. In conjunction with the connect module 144, the mobile device 100 can communicate with the node 202 within the wireless network 200. In the example implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell." The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support, namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 4:
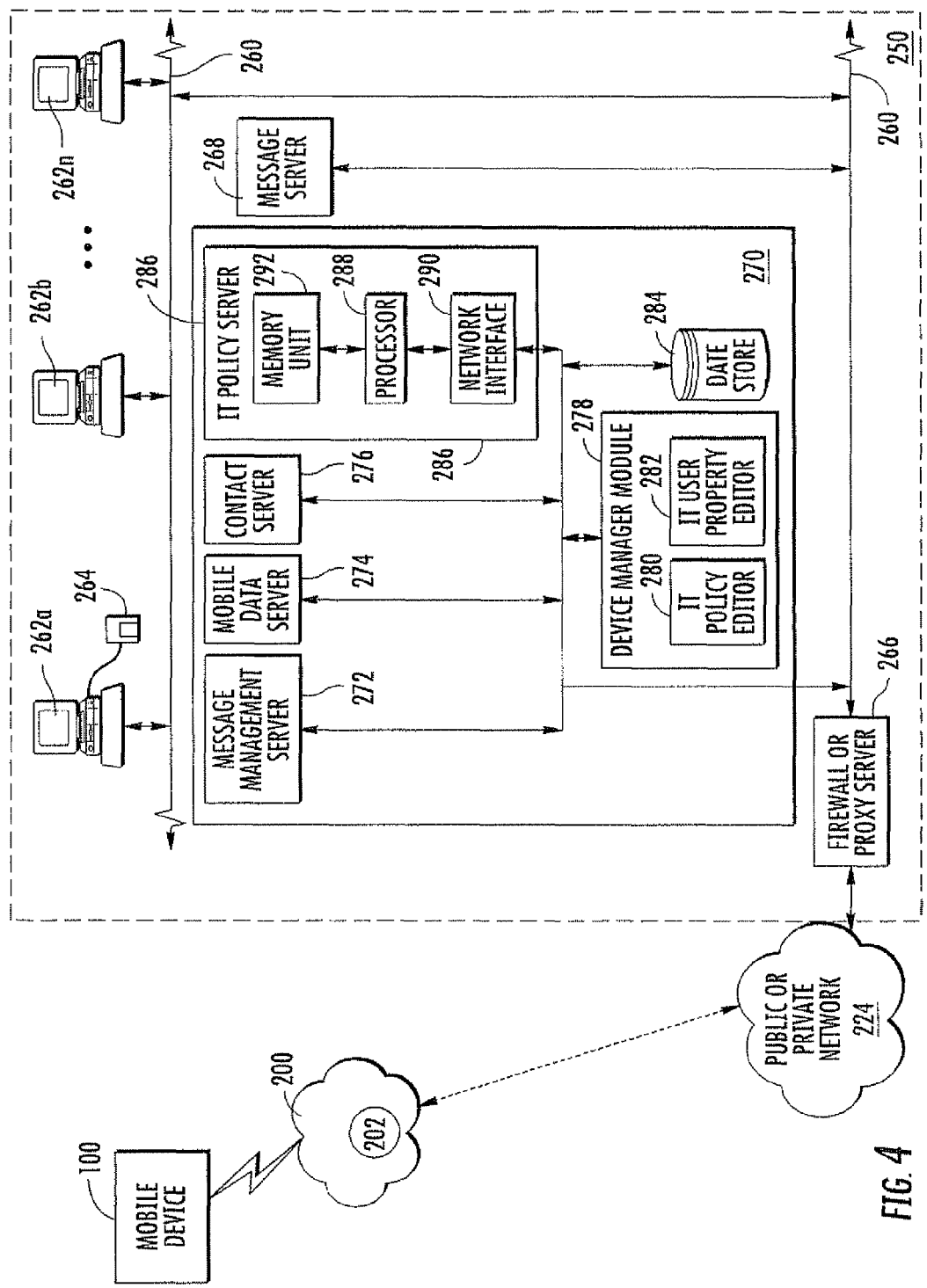
FIG. 4 is a block diagram illustrating components of a host system in one example configuration for use with the wireless network of FIG. 3 and the mobile device of FIG. 1.

Referring now to FIG. 4, shown therein is a block diagram illustrating components of an example configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 4, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 includes a number of network components connected to each other by a network 260. For instance, a user's desktop computer 262a with an accompanying cradle 264 for the user's mobile device 100 is situated on a LAN connection. The cradle 264 for the mobile device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g., PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 4 for ease of exposition, and it will be understood by persons skilled in the art that the host system 250 will include additional components that are not explicitly shown in FIG. 4 for this example configuration. More generally, the host system 250 may represent a smaller part of a larger network (not shown) of the organization, and may include different components and/or be arranged in different topologies than that shown in the example embodiment of FIG. 4.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly email messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may include multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit, such as data store 284, that the message server 268 communicates with. Messages can be subsequently retrieved and delivered to users by accessing the message server 268. For instance, an email client application operating on a user's computer 262a may request the email messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e., those received in the past two to three months for example) can be stored on the mobile device 100.

When operating the mobile device 100, the user may wish to have email messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own email address, and messages addressed specifically to the mobile device 100 are automatically redirected to the mobile device 100 as they are received by the message server 268.

The message management server 272 can be used to specifically provide support for the management of messages, such as email messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g., the message store associated with the user's account on the message server 268) for new email messages, and apply user-definable filters to new messages to determine if and how the messages are relayed to the user's mobile device 100. The message management server 272 may also compress and encrypt new messages (e.g., using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g., encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g., by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g., "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g., 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and email address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may include multiple message management servers 272, particularly in variant implementations where a large number of mobile devices need to be supported.

Alternatively, in some embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g., encryption algorithms, password rules, etc.), specifying themes or applications that are allowed to run on the mobile device 100, and the like.

Referring now to FIGS. 5-11, in accordance with non-limiting examples, a shared secret is established between a device and a server. Furthermore, the device and server are capable of supporting multiple shared secrets, rather than just one. The process may be initiated by a device owner or by a third party, e.g., carrier customer care.

In one non-limiting example for an internet service (IS) in an Enterprise implementation, the shared secret is called an "activation password" and is used to establish signing keys using a custom, SPEKE-like protocol already existing in the device and server of the IS. Multiple "activation passwords" are required since a different one may be used for each service (e.g., one for Yahoo! address book, a second for Google address book, etc).

This can be accomplished in several example embodiment ways.

It is possible to use a browser plug-in (custom content handler) on a browser running within the device. The user launches the browser, accesses a web site on the server, enters their credentials via the web page, and sends them to the server using an HTTPS (secure channel) request. The server confirms the credentials, generates the shared secret, signs it using a private key, and sends it to the device as HTTPS response (over secure channel) with custom content-type header. The device browser detects the custom content-type header and launches a custom content handler. The custom content handler extracts a shared secret, and verifies the signature using a corresponding public key. At this point, the device and server have a shared secret. For an enterprise use of the internet service, the custom content handler subsequently initiates a SPEKE-like key exchange using the shared secret.

It is possible to use pushed content to the device. The user or administrator accesses a web site (or administrator screens) on the server. The server pushes content to the device (in IS-Enterprise case, it is a service record that displays on the main ribbon). The user sees the new icon and clicks on it. The device launches a browser and goes to a web site on the server. The process continues as above.

It is possible to use a device application (e.g., thick client). The user launches an application on the device and enters credentials. The device application establishes a secure channel to the server (e.g., via SSL/HTTPS) and sends credentials to the server. The server confirms the credentials, generates a shared secret, and sends it to the device over a secure channel. The device application receives the shared secret and the server address. At this point, the device and server have a shared secret. For IS, the device application would subsequently initiate a SPEKE-like key exchange using the shared secret.

Some example embodiment aspects of the system and method are particularly useful.

1) The shared secret need not be viewed, known, or accessed by the user, eliminating concern over the user's ability to enter the shared secret into a UI. There need not be any restrictions on its complexity or length. Thus, the shared secret can be generated by the server and can be an arbitrarily long sequence of random characters. This allows the shared secret to be "stronger" (i.e., less prone to guessing) and hence provide a more robust system.

2) In an example embodiment, the shared secret is used with an existent key generation mechanism in the device and server. Thus, in this example embodiment, the device and server cannot simply exchange the signing keys over the secure channel that is initially established.

3) When using a custom content handler, the device can verify the signature on the shared secret as a means to authenticate that it was generated by the server. Otherwise, an arbitrary (unauthorized) server could generate a bogus response of the correct content-type and trick the device into storing an unauthorized shared secret.

4) The server could pre-generate a shared secret (or set of them) for a given user and store them locally prior to the user going through this process. The server would then use the pre-generated values at a future time.

5) The shared secret could be used for one of many purposes. For example, it may be used for generating signing keys, encryption keys, or other such values.

As noted before, some devices already have SPEKE-like key exchange functionality, which is in use by the ES. The IS may reuse this functionality. Before this can occur, however, an activation password is securely established between both the handheld device and the IS. The activation password is established between the handheld and the IS in different techniques in accordance with a non-limiting example. In one example aspect, it is possible to use WAP and the custom content handler.

The device may contain an Internet browser. Currently IS users can integrate email accounts via the browser on the device. Under this scenario a user launches the browser on the device and accesses an IS hosted web site. The web site can provide the ability for a user to integrate an existing email account (i.e. Yahoo!, GMail, MSN, AOL, etc.). Once an email account is integrated all incoming email sent to the user's email address is pushed to their device. In addition, users can send email from their device using the same email address.

For a user to integrate an email account they can provide the email address and the password for the given email address on the backend mail server. This can be sent over an HTTPS channel. As such, the communication channel is encrypted and the device can authenticate the server via the SSL certificate provided during the SSL handshake. Once the IS receives the email address and password, the IS authenticates the credentials against the back end mail server. For example, if the user provided a GMail email address and password then IS would contact the GMail mail servers, transmit the email address and password, and ensure that the supplied credentials are valid. Once the IS has validated the user's credentials, an encrypted and dually authenticated communication channel is established. This is a prerequisite for the exchange of a shared secret, in an example embodiment.

The IS can generate a random 'activation password'. This password will serve as the seed for the SPEKE-like key exchange. It can also assign a 'service UID' for the given email address. The IS can then sign the activation password and service UID using a private key that is securely stored within the communications infrastructure such as shown relative to FIGS. 1-4. The activation password, service UID, and signature are then transmitted in the HTTPS response to the device. The HTTP 'Content-type' header is set to a service proprietary header.

The browser can support custom rendering plug-ins. The plug-ins subscribe for specific content types which they are capable of rendering. An IS specific plug-in can be pre-installed on the device. This plug-in subscribes for the proprietary content type listed above. When the browser receives this content-type, it launches the plug-in.

When the plug-in is launched, it extracts the activation password, service UID, and signature from the HTTPS response body. The plug-in has access to a public key installed on the device, which matches the private key that is securely stored inside any infrastructure data center. The plug-in uses the public key to validate the signature on the activation password and service UID to ensure that the site that launched the browser plug-in is a IS hosted site. Once the signature has been validated the browser plug-in initiates the SPEKE-like key exchange, passing in the activation password that serves as the seed for the key exchange and the service UID which contains routing information for where the key-exchange commands should be sent.

Another example for a solution, in accordance with non-limiting aspects, is a HTML browser icon injection. IS users can also integrate email accounts via a web browser running on a desktop PC. Since the user is not running the browser from the device, it is possible that the user does not have physical access to the device (i.e. if a remote administrator is performing the functions on behalf of the user). The user must take subsequent actions in the future directly.

The IS user does not need to remember the activation password which is a temporary one-time password. The internet service user is only required to remember their email account password. The transmission and use of the activation password is transparent to the user.

Furthermore, since the service UID is sent along with the activation password, the initial key exchange command is sent directly to the IS. As such there is no need for the IS to poll the IS user's mailbox. This IS solution does not require an administrator and is beneficial. The IS user can setup their account on their own as compared to relying on an administrator to set up a user's account.

As noted before, an existing solution may be in use today by the Enterprise System (ES). This solution uses a key exchange protocol similar to SPEKE (Simple Password Exponential Key Exchange) to establish a symmetric encryption key between a device and a ES server.

The device can have an Enterprise Activation (EA) application pre-installed. An ES user calls their IT Administrator to request that their corporate email account be activate on the handheld. The IT Administrator generates a new activation password, stores the activation in the ES database, and communicates this activation password to the ES user. The ES user launches the EA application and enters their email address and activation password. The handheld uses the activation password to seed the SPEKE-like key exchange and transmits the initial key exchange command directly to the ES user's corporate mailbox.

The ES monitors the mailbox, extracts the initial key exchange command and proceeds with the key exchange. The subsequent key exchange command contains routing information (service UID), which allows the handheld to send all remaining key exchange commands directly to the ES server, bypassing the mailbox.

In accordance with a non-limiting example, the IS OTAKEYGEN (Over-the-Air Key Exchange) securely establishes cryptographic keys between the IS and devices such as the example portable wireless communications device. The cryptographic keys enables the IS to digitally sign or encrypt packets sent to and received from the device. This feature is required to enable other features on the handheld. For example, an IS PIM Sync (synchronization) requires digital signatures due to security restrictions on the device.

1. Initiating OTAKEYGEN may be done in several ways:
   a) directly on the device; and
   b) not initially directly on the device, i.e., initially through HTML or Web Admin UIs.
2. There are two (2) modes for initiating OTAKEYGEN not initially directly on the device:
   a) username/password mode; and
   b) seamless sign-on (SSO).
3. Another variation of the idea is to always initiate OTAKEYGEN.

OTAKEYGEN provides a way to establish securely a cryptographic key between the IS and a device. An encrypted and dually authenticated channel is used such that both end points establish a shared secret, which is required in order to seed the OTAKEYGEN process.

In an example embodiment, IS has a IS client that runs on the device. OTAKEYGEN sessions in IS are triggered through this device client. IS users enter their credentials into a UI in the device client. The device client makes a call to IS providing credentials, which authenticates the user. This call could be a REST call and is made over an HTTPS connection to hide the user's credentials through encryption. Furthermore, the HTTPS connection allows the device client to authenticate the server used at the IS via the SSL certificate. Once IS has authenticated the user's credentials, both end points have authenticated each other. At this point, there is an encrypted and dually authenticated channel.

IS then sends the following information in the response: a) Service UID as a server address; and b) activation password.

The device client passes the activation password and service UID to the activation service on the device. This initiates OTAKEYGEN on the device. Because the service UID was transmitted with the activation password, there is no requirement for IS to monitor the user's mailbox. The initial OTAKEYGEN command is sent directly to IS (via the supplied service UID), which describes how OTAKEYGEN sessions trigger in IS.

There are three different UIs that a user may use to set up their accounts in IS: the device client, an HTTP UI, and WebAdmin UI. When a user sets up their account directly from the device client, IS transmits the activation password and service UID for the source to the device client if the user selected a service, which requires OTAKEYGEN. For example, this can be accomplished if the user integrates address book sync and the device supports OTAKEYGEN for IS.

A user may set up an IS email account via the HTML or WebAdmin UIs, but activation is not complete until the device (thick) client is activated on the device. In this case, OTAKEYGEN is completed by the user on the device. When the user runs the device client, the credentials are entered, an SSL connection is created and as a result, the IS and the device have an encrypted channel, and both end points can maintain a shared secret.

Since OTAKEYGEN must be initiated from the device there is no way to initiate OTAKEYGEN automatically when the user integrates a source via the HTML or WebAdmin UIs. If a user does integrate a source which requires OTAKEYGEN via the HTML or WebAdmin UI's, a message is displayed to the user informing them to run the thick client and complete the OTAKEYGEN process. Additionally, IS sends a message to the device with the same instructions.

For purposes of this description, it should be understood that the term seamless sign-on (SSO) corresponds to the system allowing users to access the system and allow activation without the system making the user type a username and password. Thus, the sign-on becomes "seamless" from the standpoint of the user. The term "service book" is a term used for the file that contains information of how the device is configured and will interact with the infrastructure or Internet server. For example, service book could enable specific services for a client device. The selection of service books can depend upon features provided by different carriers and the IT policy established by an organization that uses the device. Different service books could be for provisioning, browser configurations, WAP transport and other examples as non-limiting examples.

Example embodiment device client can run in username/password mode and/or seamless sign-on (SSO) modes. These two modes are handled separately. In another example embodiment, OTAKEYGEN is always initiated. This solution does not require that the user contact an administrator to obtain an activation password. The activation password is transmitted transparently to the device client, which automatically triggers OTAKEYGEN. Furthermore, because the service UID is transmitted with an activation password, there is no requirement for IS to monitor the mailbox since the initial key request message can be sent directly to the service rather than the mailbox.

Figure 5:
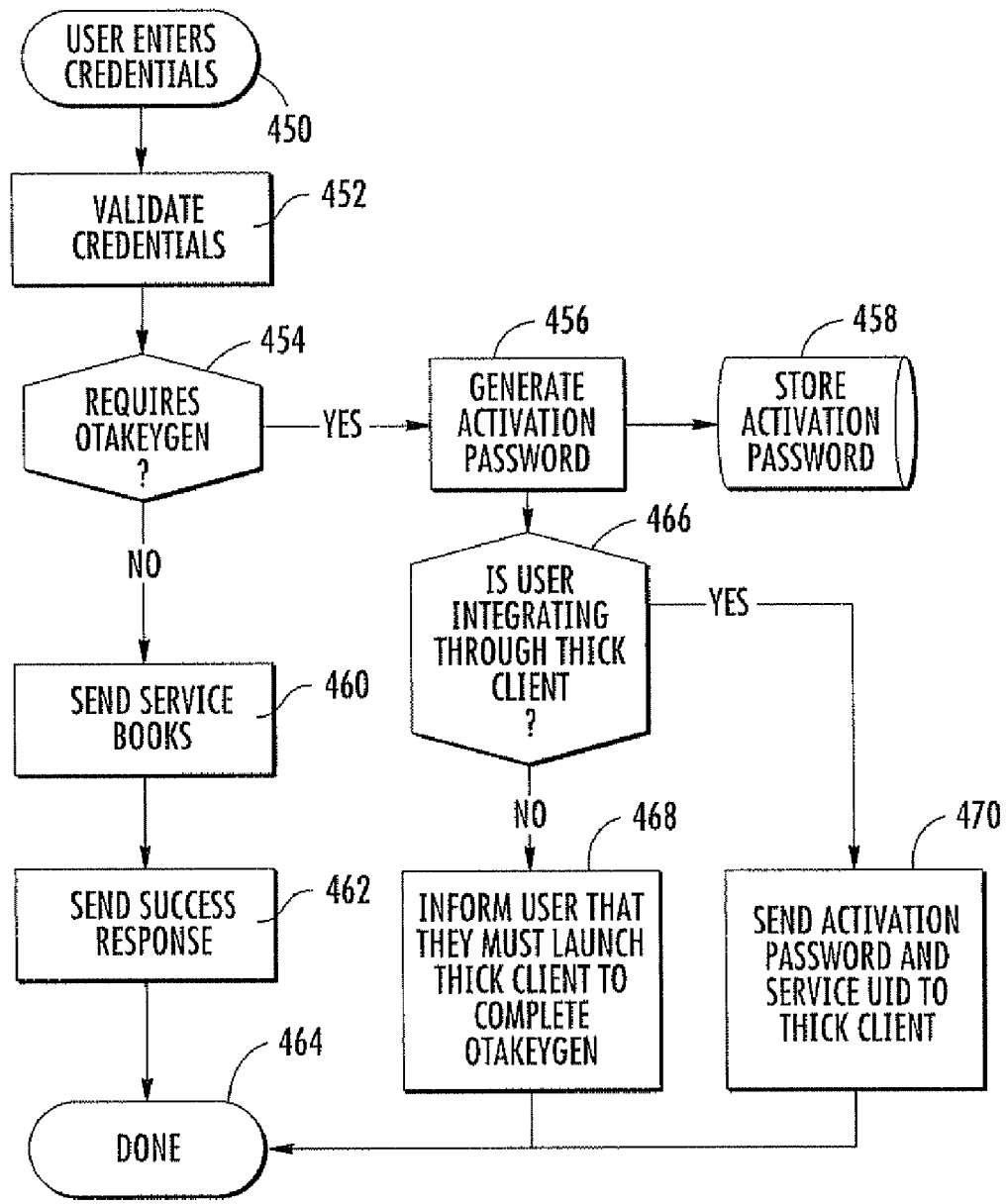
FIG. 5 is an example of a high-level flow diagram showing steps used for generating an activation password in accordance with non-limiting aspects.

FIG. 5 is a high-level flowchart illustrating a process for activating a password in a non-limiting example. As shown, a user can enter credentials (Block 450). The credentials are validated (Block 452). A determination is made whether OTAKEYGEN is required (Block 454). If yes, the activation password is generated (Block 456) and stored (Block 458). If no, the service books are sent (Block 460) and the response as a success sent (Block 462). The process is then done (Block 464). When the activation password is generated in Block 456, a determination is made whether the user is integrating through the thick client (Block 466). The thick client corresponds to the application on the mobile device. If not, the user is informed that they should launch the thick client as the application software to complete OTAKEYGEN (Block 468). If yes, the activation password and service UID is sent to the thick client (Block 470).

Figure 6:
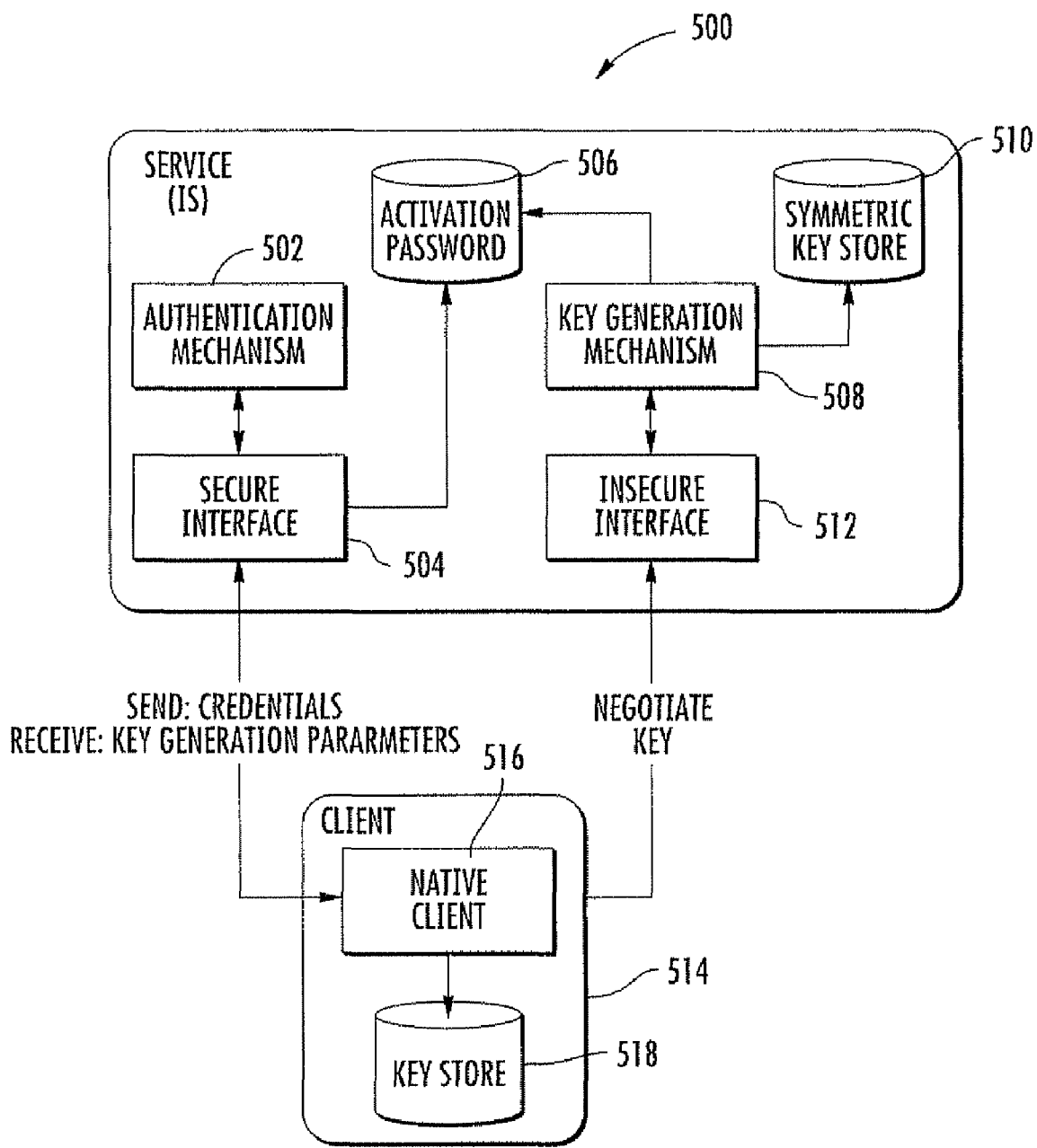
FIG. 6 is a block diagram for a native client and showing the IS as an Internet service and client and various components associated with both the IS and client, according to an example embodiment.

FIG. 6 shows a block diagram for the native client and showing the internet service (IS) 500 with various components including the authentication mechanism 502, secure interface 504, activation password database 506, key generation mechanism 508, the symmetric key store database 510, and insecure interface 512, according to an example embodiment. The client 514 includes the native client 516 and key store database 518. The secure interface 504 interoperates with the native client 516 and the client and secure interface communicate the credentials and key generation parameters as illustrated and explained above. The native client 516 negotiates the key with the insecure interface 512.

Figure 7:
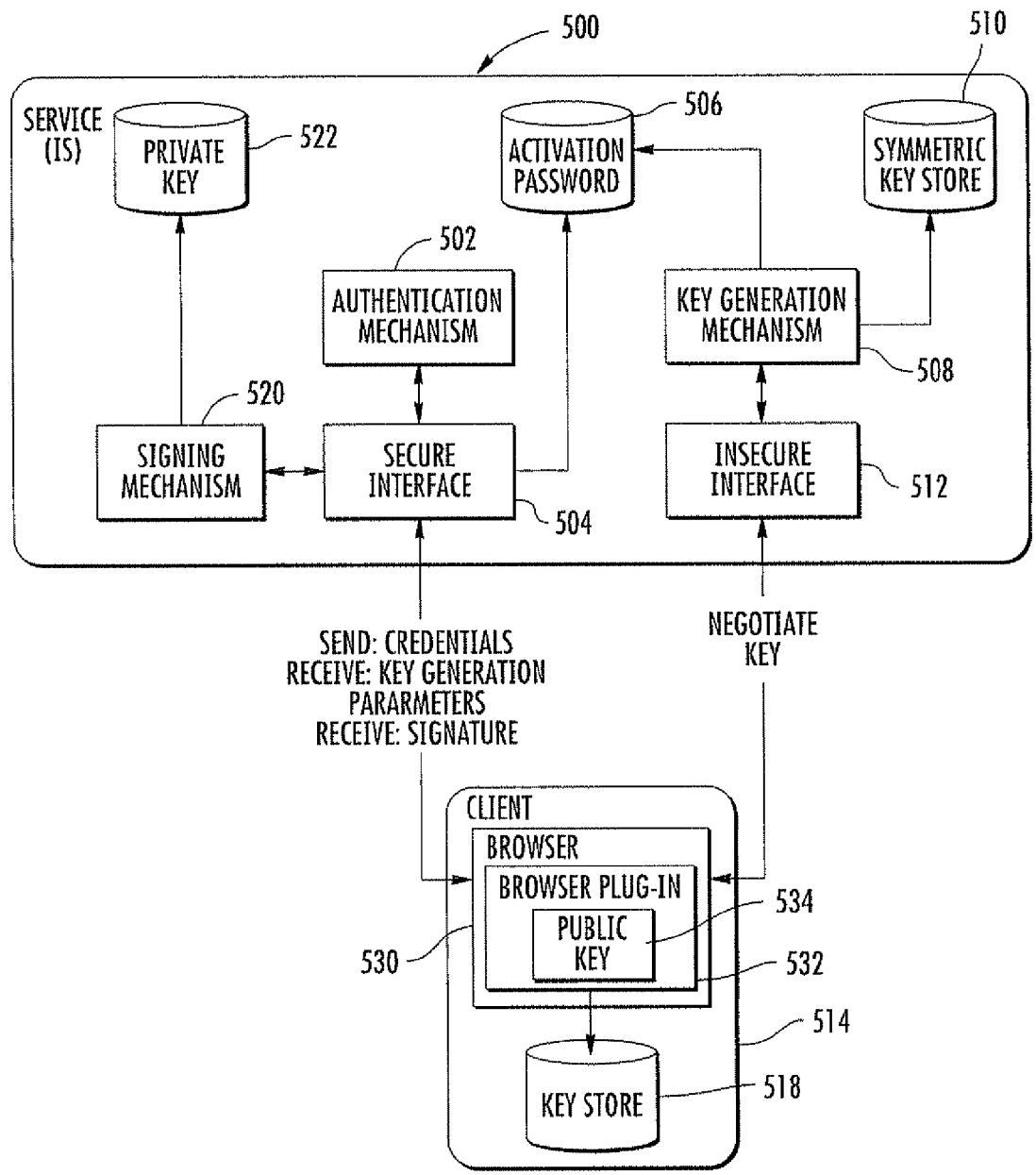
FIG. 7 is another block diagram similar to that shown in FIG. 6 and showing the native client and TS with an added browser plug-in and associated components and the private key and signing mechanism used in the IS, according to an example embodiment.

FIG. 7 is another block diagram similar to that shown in FIG. 6, but also showing with the IS 500 a signing mechanism 520 and a private key database 522, according to an example embodiment. The client 514 also includes a browser 530 that includes a browser plug-in 532 and public key 534. These interoperate together as explained above.

As noted before, the native client 516 as shown in FIG. 6 can include a browser and a custom content handler as a browser plug-in 532 that interoperates with the public key 534 and can access a website on the internet server 500. In one example, the user launches the browser 530 and accesses the internet server and enters their credentials via a secure interface 504 that operates with the authentication mechanism 502 to authenticate the credentials. The server 500 can generate a shared secret and sign it using a private key by checking with the authentication mechanism 502 for the credentials and password 506. The shared secret can be assigned using the private key with the key generation mechanism 508 and operates with the symmetric key store 510 as a database that stores various keys. The browser 530 can detect the custom content-type header from the internet server in which the key generation parameters have been received and extract the shared secret and verify the signature using a corresponding public key that had been negotiated through an insecure interface 512, for example. At this point, the device and server have the shared secret.

As noted before, the activation password 506 can be established between the client as a native client 516 and internet server such as, for example, using WAP and the custom content handler. As noted before, the browser plug-in 532 has access to the public key installed on the device. This is established through the secure interface with the signing mechanism 520 and the private key database 522 to provide the secure transaction. The browser plug-in 532 extracts the activation password, service UID and signature and has access to a public key installed on the device such as stored in the key store 518 after working through the insecure interface 512. The public key can be used to validate the signature on the activation password that is obtained through the database 506 at the Internet server 500.

Figure 8:
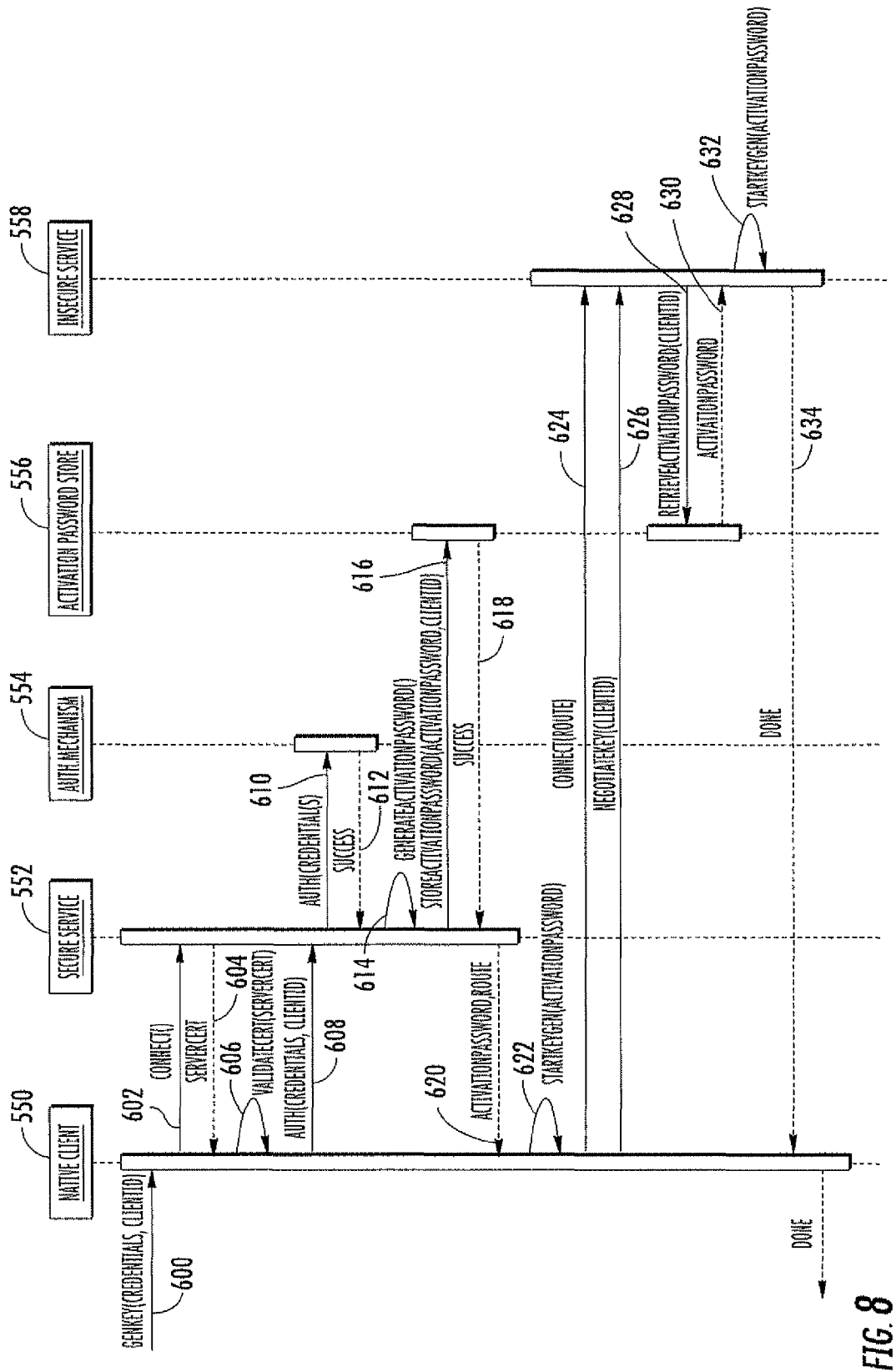
FIG. 8 is a sequence diagram used with the native client, according to an example embodiment.

FIG. 8 is a sequence diagram for the native client and shows the various components with reference numerals beginning in the 550 series and showing the native client 550, secure service 552, authentication mechanism 554, activation password store 556 and insecure service 558, according to an example embodiment. As illustrated, connection is made between the native client 550 and secure service 552 with the validation and authentication occurring together with the authentication mechanism and the generating of the activation password and storing the activation password after a success. The key is negotiated and the sequence done as shown at the bottom.

Figure 9:
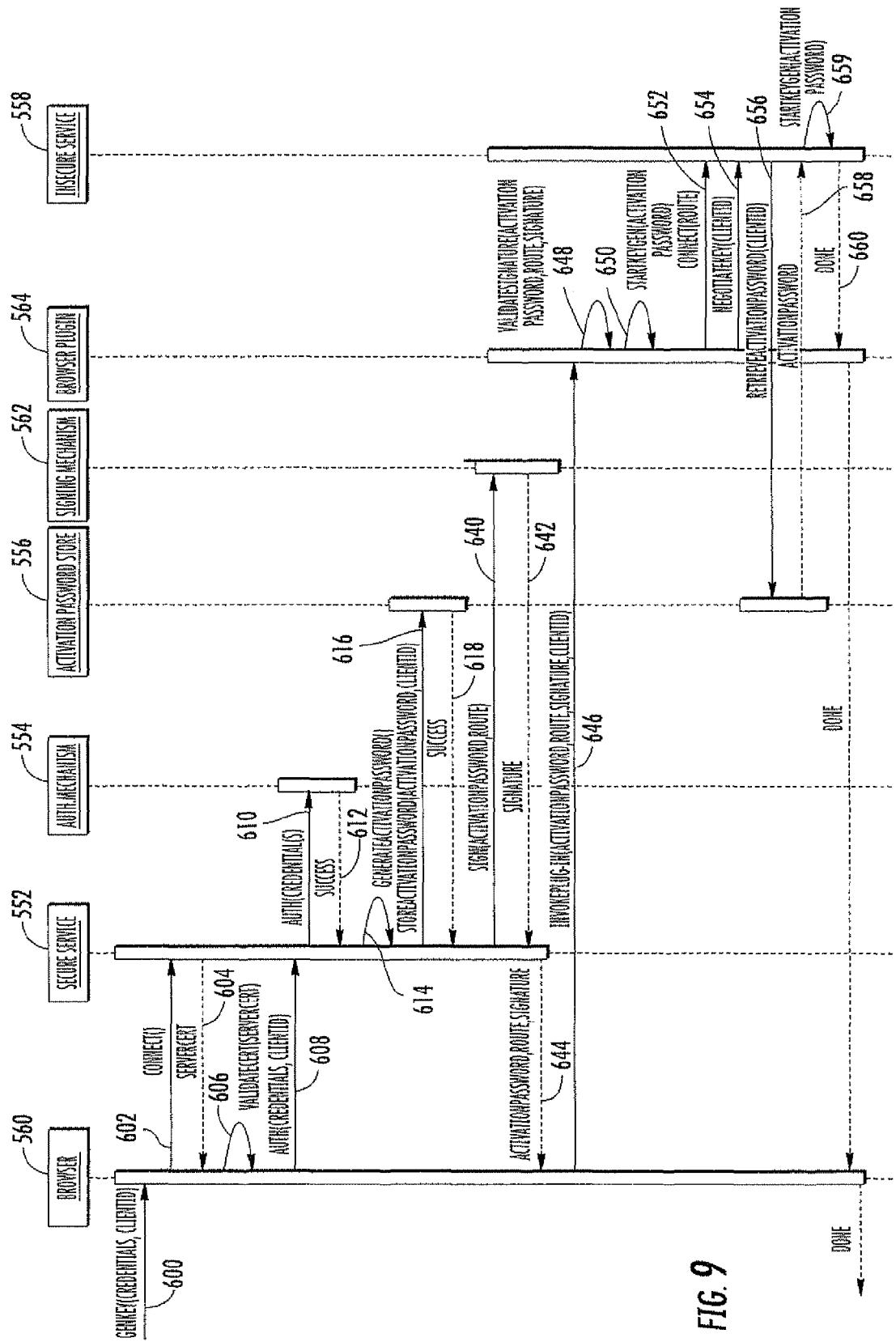
FIG. 9 is a sequence diagram used with the browser plug-in, according to an example embodiment.

FIG. 9 shows a browser plug-in sequence that also includes the different additions of the signing mechanism 562 and browser plug-in 564, according to an example embodiment. The sequence is similar at the top portion of that shown in FIG. 8, but the plug-in is invoked as shown between the browser and browser plug-in and the signature validated and then steps continue until accomplished as illustrated.

Figure 10:
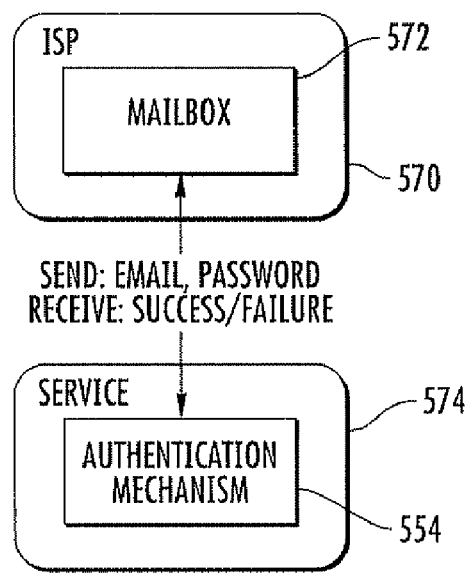
FIG. 10 is a block diagram showing an example of an authorization mechanism.

FIG. 10 shows an implementation of an authorization mechanism and showing an internet service provider 570 and mailbox 572 and interoperating with the service 574 that includes the authentication mechanism 554 that is part of the service, according to an example embodiment. The service corresponds to the internet service as described above in this example.

Figure 11:
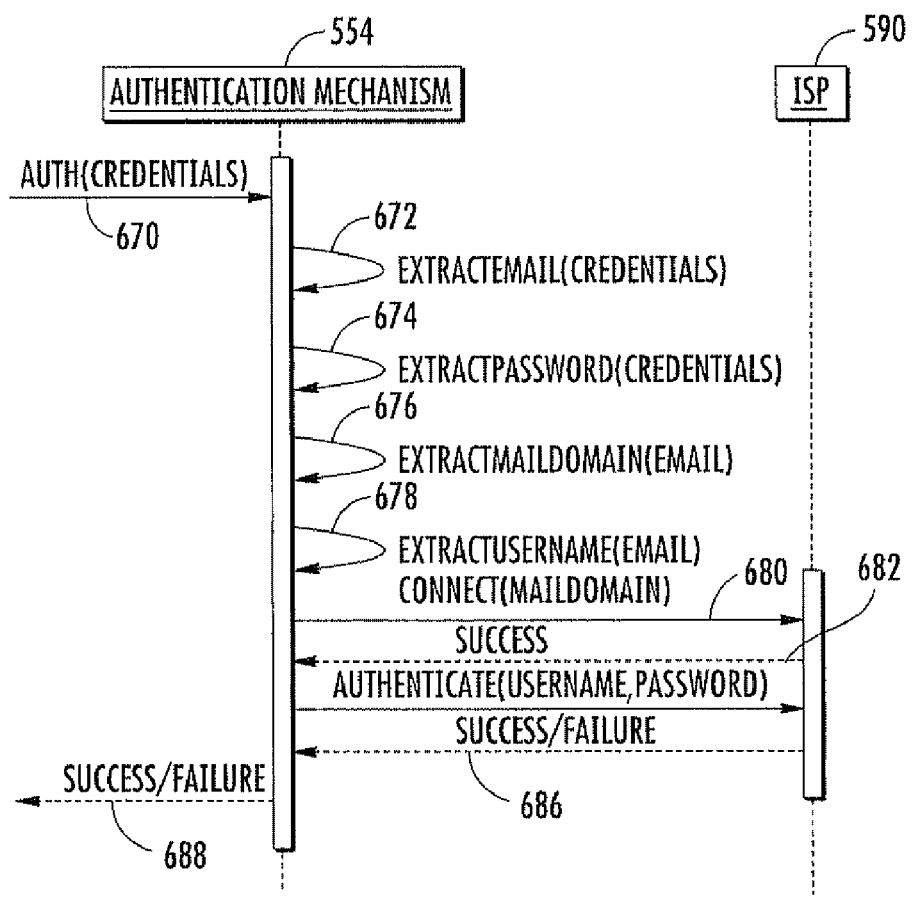
FIG. 11 is a sequence diagram for an example authentication mechanism of the type shown in FIG. 10.

FIG. 11 shows a sequence between the authentication mechanism 554 and an internet service provider 590, according to an example embodiment.

Referring now to FIGS. 8 and 9, a description of the sequence as illustrated follows with the description following and starting with numerals in the 600 series for the various flow arrows. As illustrated, the credentials and client ID are generated for the key (arrow 600). A connection is established (arrow 602) and certified (arrow 604). Validation occurs (arrow 606) followed by authentication with the credentials and client ID (arrow 608). These exchanges occur between the native client 550 and secure service 552. The credentials are authenticated (arrow 610) between the secure service 552 and authentication mechanism 554. If there is success, it is confirmed (arrow 612) and the activation password generated with the secure service (arrow 614) shown by the loop back. The activation password is stored between the secure service 552 and activation password store 556 (arrow 616) and success confirmed (arrow 618). The activation password is routed as shown (arrow 620) and a start key generation occurs (arrow 622). A connection is established (arrow 624) between the native client 550 and the insecure service 558 and the key negotiation initiated (arrow 626). The activation password is requested (arrow 628) between the insecure service 558 and activation password store 556, and the activation password is returned (arrow 630). The activation password is used for OTAKEYGEN (arrow 632) between the insecure service 558 and native client 550 and the confirmation is accomplished (arrow 634).

FIG. 9 shows a similar view, but with added browser 560 and signing mechanism 562 and browser plug-in 564. The sequence steps up to arrow 618 are the same followed by generating the signature between the secure service 552 and the signing mechanism 562 as shown by arrow 640. The signature occurs (arrow 642) and is returned (arrow 644). The plug-in is invoked between the browser 560 and browser plug-in 564 (arrow 646). The signature is validated (arrow 648) and a start key generation occurs (arrow 650). Connection is made between the browser plug-in 564 and insecure service 558 (arrow 652) and the key negotiation initiated (arrow 654). The activation password is requested between the insecure service 558 and activation password store 556 (arrow 656), and is returned (arrow 658). The activation password is used for OTAKEYGEN (arrow 659) and the confirmation is accomplished (arrow 660).

FIG. 10 shows that the authentication mechanism 554 works with the mailbox 572 as part of the internet service provider 570 in which the email and password is forwarded by the service 574 and can receive a success or failure.

FIG. 11 shows the series of steps between the authentication mechanism 554 and the ISP 590 and beginning with arrows starting at 670 in which credentials are authenticated with the authentication mechanism. A series of loops occur with the credentials extracted (arrow 672) and the password extracted (arrow 674) and the mail domain extracted (arrow 676) and the user name extracted (arrow 678). A connection is made (arrow 680) between the authentication mechanism 554 and the ISP 590 followed by authentication (arrow 682). If there is success, it is established (arrow 686) as indicated with confirmation (arrow 688).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system that exchanges key generation parameters for secure communications, comprising:
    an internet service and communications device in communication with each other;
    the internet service comprising a user account authentication mechanism, and including a database having stored private keys;
    the communications device is configured to transmit user credentials and a request to the internet service to validate the user wherein a secure communications channel is established between the internet service and communications device; and
    the internet service transmits a password signed using one of the private keys and used to establish an encryption key between the internet service and the communications device.

2. The communications system according to claim 1, and further comprising a user interface on the wireless communications device into which a user enters credentials that are transmitted to the internet service for validating the user, wherein the internet service in response, looks up key generation parameters based on username and transmits key generation parameters back to the communications device.

3. The communication system according to claim 2, wherein said key generation parameters comprise a password and a server address to contact to initiate a key generation exchange.

4. The communications system according to claim 2, wherein said username and password comprise an email address and password of the electronic mail account of the user.

5. The communications system according to claim 2, and further comprising an HTTPS connection between the internet service and a device client over which the username and password are transmitted for validating the user at the internet service.

6. The communications system according to claim 2, wherein the user enters multiple credentials corresponding to multiple user accounts and receives key generation parameters for each set of credentials.

7. The communications system according to claim 1, wherein the communications device is in communication with the internet service over a wireless communications connection.

8. The communications system according to claim 1, and further comprising a browser plug-in into which a user enters credentials comprising a username and password on a web page that are transmitted to the internet service for validating the user, and the internet service in response, returns an attachment containing key generation parameters that trigger the plug-in to execute and initiate a key generation exchange.

9. The communications system according to claim 8, wherein the attachment is signed using a private key maintained by the internet service and verified by a corresponding public key maintained on the communications device.

10. A method for exchanging key generation parameters for secure communications, comprising:
    establishing a communications channel between an internet service and a communications device of a user, wherein the internet service comprises a user account authentication mechanism and a database having stored private keys;
    transmitting user credentials and initiating a request to the internet service operating on the communications device for validating the user and establishing a secure communications channel between the internet service and communications device; and
    transmitting a password signed using one of the private keys and to establish an encryption key between the internet service and the communications device.

11. The method according to claim 10, which further comprises entering on a user interface at the communications device credentials comprising a username and password and transmitting the credentials to the internet service for authenticating the user, and in response, at the internet service, looking up key generation parameters based on the username and transmitting key generation parameters back to the communications device.

12. The method according to claim 11, wherein the key generation parameters comprise a password and a server address to contact to initiate a key generation exchange.

13. The method according to claim 11, wherein the username and password comprise an email address and password of the electronic mail account of the user.

14. The method according to claim 11, which further comprises forming an HTTPS connection between the internet service and a device client over which the username and password are transmitted for validating the user at the internet service.

15. The method according to claim 11, which further comprises entering multiple credentials corresponding to multiple user accounts and receiving key generation parameters for each set of credentials.

16. The method according to claim 10, which further comprises entering at a browser credentials comprising a username and password on a web page that are transmitted to the internet service for validating the user, and the internet service in response, returning an attachment containing key generation parameters that trigger the browser plug-in to execute and initiate a key generation exchange.

17. The method according to claim 16, which further comprises signing the attachment using a private key maintained by the internet service and verified by a corresponding public key maintained on the communication device.

18. A mobile wireless communications device, comprising:
    a transceiver;
    a processor connected to the transceiver;
    a memory connected to the processor and storing private keys; and
    wherein the processor and the transceiver is configured to transmit user credentials and a request to an internet service by transmitting a communications signal from the transceiver that authenticates the user and establishes a secure communications channel between the internet service and communications device, wherein the internet service transmits a password signed using one of the private keys and used to establish an encryption key between the internet service and the communications device.

19. The mobile wireless communications device according to claim 18, and further comprising a user interface into which a user enters credentials comprising a username and password that are transmitted to the internet service for validating the user wherein key generation parameters are received back from the internet service in response.

20. The mobile wireless communications device according to claim 18, wherein the communications device is in communication with the internet service over a wireless communications connection.

21. The mobile wireless communications device according to claim 18, and further comprising a browser into which a user enters credentials comprising a username and password on a web page that are transmitted to the internet service for validating the user and wherein an attachment containing key generation parameters is received and processed by said processor that triggers the browser plug-in to execute and initiate a key generation exchange.

22. The mobile wireless communications device according to claim 21, wherein said memory further comprises a public key maintained on the communication device for verifying the attachment that had been signed using a private key maintained by the internet service.

* * * * *